(12) United States Patent
Maekawa et al.

(10) Patent No.: US 6,532,647 B1
(45) Date of Patent: Mar. 18, 2003

(54) MANUFACTURING METHOD OF COMPOSITE TYPE THIN-FILM MAGNETIC HEAD

(75) Inventors: Kazuya Maekawa, Tokyo (JP); Akio Iijima, Tokyo (JP); Tetsuya Mino, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/506,604

(22) Filed: Feb. 18, 2000

(30) Foreign Application Priority Data

Feb. 22, 1999 (JP) .......................... 11-043392

(51) Int. Cl.$^7$ .......................... G11B 5/129; H04R 31/00
(52) U.S. Cl. .................. 29/603.13; 29/603.01; 29/603.11; 29/603.12; 29/825; 360/113; 360/125; 360/235; 360/322; 205/665; 205/666; 205/703; 205/763; 205/771; 216/22; 216/41; 216/63; 216/67
(58) Field of Search .................. 29/603.01, 603.11, 29/603.12, 603.13, 825; 360/113, 125, 235, 322; 216/22, 41, 63, 67; 205/665, 666, 703, 763, 771

(56) References Cited

U.S. PATENT DOCUMENTS

| | | | | | |
|---|---|---|---|---|---|
| 4,550,353 A | * | 10/1985 | Hirai | .......................... | 360/125 |
| 4,749,439 A | * | 6/1988 | Kobayashi | .................. | 156/645 |
| 4,841,624 A | * | 6/1989 | Togawa | .......................... | 29/603 |
| 5,351,158 A | * | 9/1994 | Shibata | .......................... | 360/113 |
| 5,435,053 A | * | 7/1995 | Krounbi | .......................... | 29/603 |
| 5,452,164 A | * | 9/1995 | Cole | .......................... | 360/113 |
| 5,467,881 A | * | 11/1995 | Gill | .......................... | 216/22 |
| 5,491,600 A | * | 2/1996 | Chen | .......................... | 360/113 |
| 5,700,380 A | | 12/1997 | Krounbi et al. | .............. | 216/22 |
| 5,883,764 A | * | 3/1999 | Pinarbasi | .................. | 360/113 |
| 5,912,790 A | * | 6/1999 | Yoda | .......................... | 360/113 |
| 5,930,659 A | * | 7/1999 | Klein et al. | .................. | 438/491 |
| 5,936,811 A | * | 8/1999 | Seagle | .......................... | 360/113 |
| 6,260,256 B1 | * | 7/2001 | Sasaki | .......................... | 29/603.01 |
| 6,339,518 B1 | * | 1/2002 | Chang | .......................... | 360/235.5 |

* cited by examiner

*Primary Examiner*—Peter Vo
*Assistant Examiner*—Paul Kim
(74) *Attorney, Agent, or Firm*—Armstrong, Westerman & Hattori, LLP

(57) ABSTRACT

A manufacturing method of a composite type thin-film magnetic head with a reading head element and an inductive writing head element, includes a step of forming the reading head element and its lead conductor layers on a first insulation layer, a step of forming a second insulation layer to cover the reading head element and the lead conductor layers, a step of forming a second shield layer on the second insulation layer, a step of forming a third insulation layer, and a step of forming via holes and a back gap hole. The via holes and back gap hole forming step is executed by reactive ion etching (RIE) for simultaneously removing the second insulation layer and the third insulation layer located at the via holes and the third insulation layer located at the back gap hole.

9 Claims, 17 Drawing Sheets

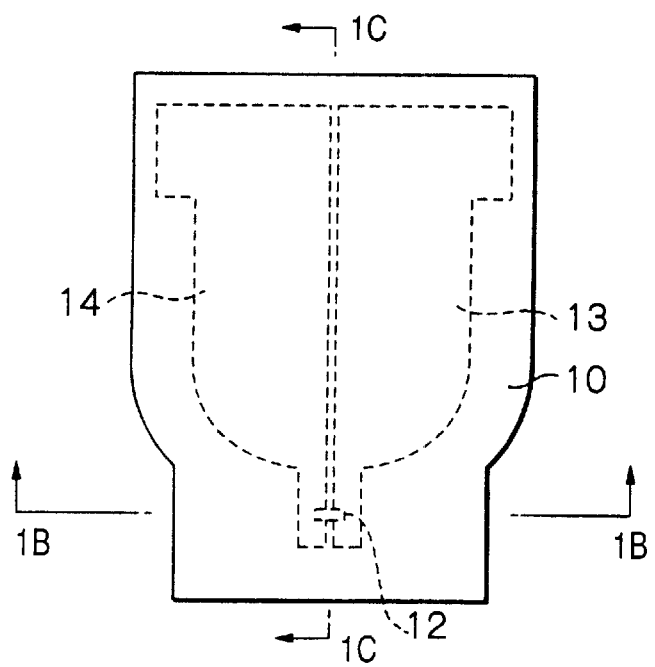
Fig. 1A
Fig. 1B
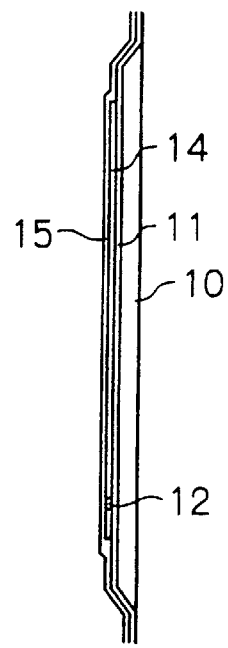
Fig. 1C

Fig. 3A
Fig. 3C
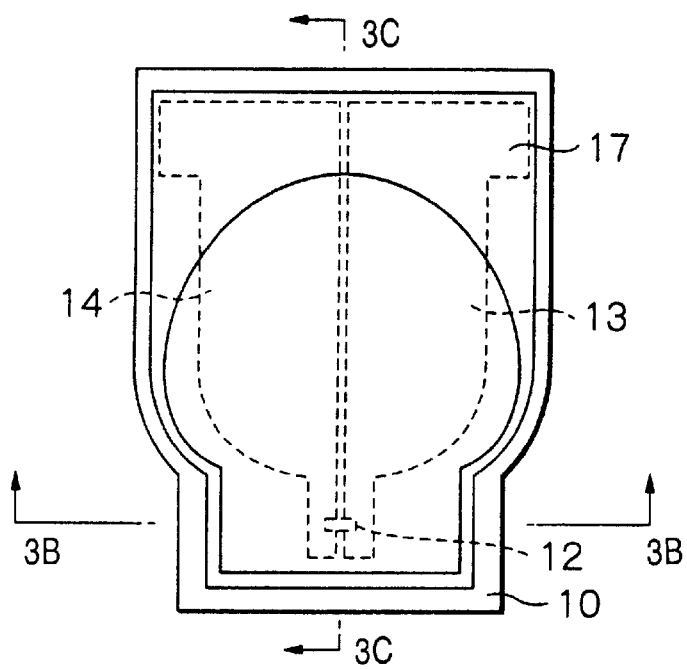
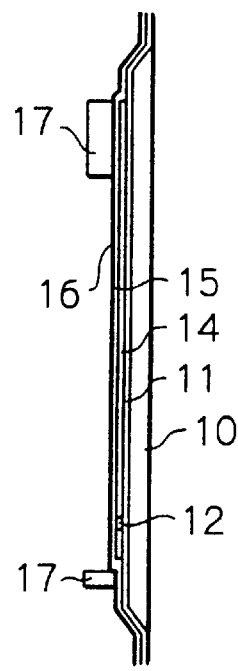
Fig. 3B
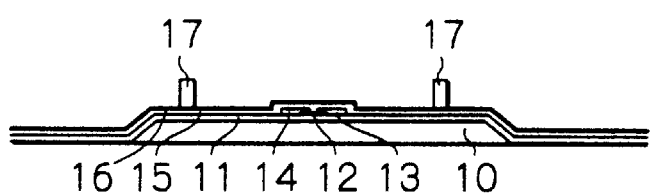

Fig. 5A
Fig. 5C
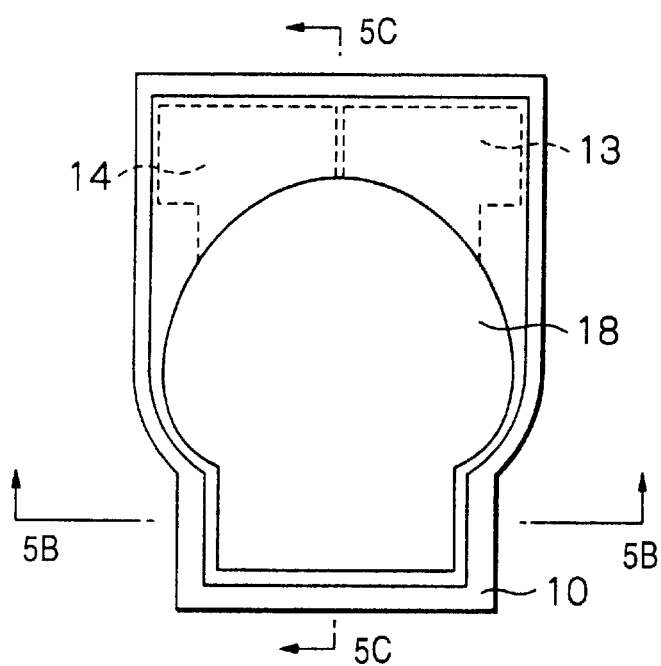
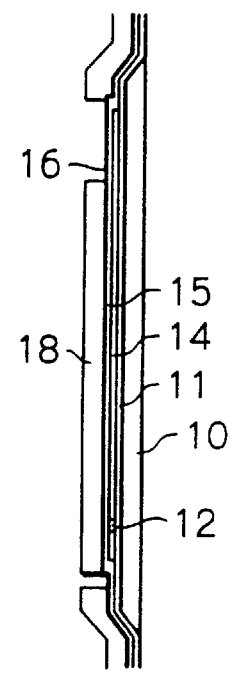
Fig. 5B
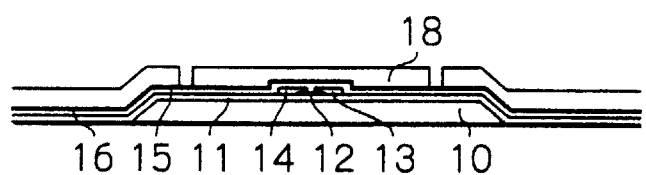

Fig. 9A
Fig. 9C
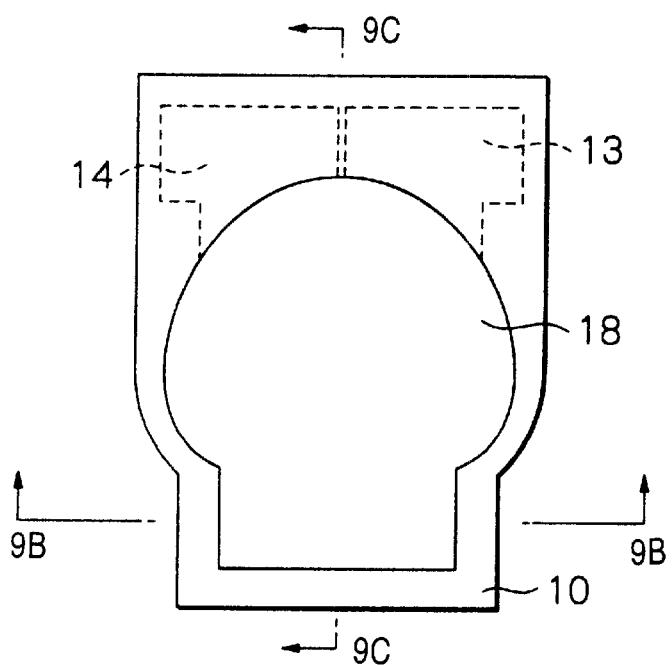
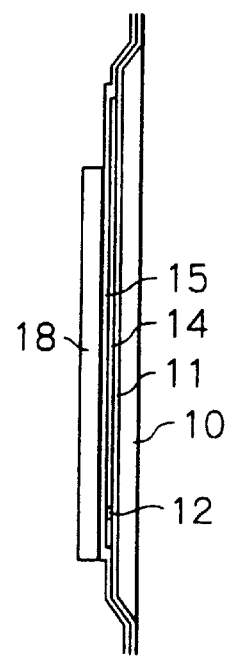
Fig. 9B
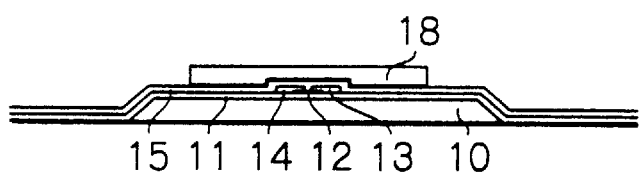

MANUFACTURING METHOD OF COMPOSITE TYPE THIN-FILM MAGNETIC HEAD

FIELD OF THE INVENTION

The present invention relates to a manufacturing method of a composite type thin-film magnetic head with a reading head element for reproducing data from a magnetic medium such as a magnetic disk and with a writing head element for recording data into the magnetic medium.

DESCRIPTION OF THE RELATED ART

A conventional manufacturing method of such composite type thin-film magnetic head is as follows.

First, on an under layer which has been deposited on a substrate, a lower shield layer and a lower insulation or gap layer (G1) are sequentially deposited and patterned. On the lower gap layer (G1), a magnetoresistive effect (MR) element which is one example of the reading head element and lead conductor layers connected to the MR element are then formed. An upper insulation or gap layer (G2) is deposited to cover the MR element and the lead conductor layers. Then, the upper gap layer are partially removed by ion milling to form via holes used for externally connecting or leading the lead conductor layers after a conductive material is filled therein at a later manufacturing step.

Thereafter, an upper shield layer which also serves as a lower pole layer of the inductive writing head element is formed and a pole insulation or gap layer (G3) of the inductive writing element is formed to cover the upper shield layer. Then, the pole gap layer (G3) is partially removed by ion milling to form a back gap hole used for connecting magnetic poles of the inductive element at their backside after a magnetic material is filled therein at a later manufacturing step. The gap layer material which was deposited in the via holes when forming the pole gap layer (G3) is also removed by this ion milling.

As will be understood from the above description, the upper gap layer (G2) and the pole gap layer (G3) are formed in different manufacturing steps. Also, the thickness of the upper gap layer (G2) and the pole gap layer (G3) differ with each other. Thus, the via holes used for externally connecting or leading the lead conductor layers of the MR element and the back gap hole used for connecting the magnetic poles of the inductive element cannot be made in the same ion milling process.

Furthermore, since the back gap hole is made in the manufacturing step executed after the manufacturing step of the via holes, it is necessary that the via holes are filled to a partial depth with material such as NiFe which is used for forming the upper shield layer in order to protect their bottom surfaces from ion milling. However, this partially filled material may still remain after a conductive material is filled in the via hole to make via hole conductors causing the electrical resistance of whole lead conductors connected to the MR element to increase.

U.S. Pat. No. 5,700,380 discloses a method for simultaneously forming such via holes and back gap hole in the same wet etching process by using a single photomask.

However, this method is a wet etching method and uses etchant. Thus, in order to simultaneously etch insulation material layer with different thickness to make holes with different diameters, it is required to carefully set up the size of openings in the photomask for via holes and back gap hole in consideration of etching time etc. Therefore, manufacturing process control becomes very difficult.

SUMMARY OF THE INVENTION

It is therefore an object of the present invention to provide a manufacturing method of a composite type thin-film magnetic head, whereby via holes used for externally connecting or leading lead conductor layers of a reading head element and a back gap hole used for connecting magnetic poles of an inductive writing head element can be easily formed in the same manufacturing process.

According to the present invention, a manufacturing method of a composite type thin-film magnetic head with a reading head element and an inductive writing head element, includes a step of forming the reading head element and its lead conductor layers on a first insulation layer which is formed on a first shield layer, a step of forming a second insulation layer to cover the reading head element and the lead conductor layers, a step of forming a second shield layer on the second insulation layer, a step of forming a third insulation layer to make a magnetic gap between magnetic poles of the inductive writing head element, and a step of forming via holes used for externally connecting the lead conductor layers and a back gap hole used for connecting the magnetic poles of the inductive writing head element at their back sides. Particularly, according to the invention, the via holes and back gap hole forming step is executed by reactive ion etching (RIE) for simultaneously removing the second insulation layer and the third insulation layer located at the via holes and the third insulation layer located at the back gap hole.

Since RIE etching rate of the insulation layer or layers to be etched greatly differs from that of the stop layer which is located under the insulation layer or layers and exposed during etching, the insulation layer or layers with different thickness can be simultaneously and extremely easily etched by RIE.

Furthermore, since the back gap hole and the via holes are formed simultaneously, it is not necessary to fill the via holes to a partial depth with material used for forming the upper shield layer in order to protect their bottom surfaces from etching. Thus, the via hole conductors can be made of conductive material only, resulting the electrical resistance of the whole lead conductors connected to the reading head element to keep quite low.

It is preferred that the via holes and back gap hole forming step includes forming a resist pattern with first openings at the via holes and a second opening at the back gap hole, executing RIE for simultaneously removing the second insulation layer and the third insulation layer located within the first openings of the resist pattern and the third insulation layer located within the second opening of the resist pattern, and removing the resist pattern.

It is also preferred that the method further includes a step of forming a fourth insulation layer on the third insulation layer, and a step of forming a coil for driving the inductive writing head element on the fourth insulation material by plating a conductive material, the via holes being simultaneously filled with the plated conductive material.

According to the present invention, also, a manufacturing method of a composite type thin-film magnetic head with a reading head element and an inductive writing head element includes a step of preparing a substrate, a step of depositing an under layer on the substrate, a step of forming a first shield layer on the under layer, a step of forming a first insulation layer to cover the first shield layer, a step of forming the reading head element and its lead conductor layers on the first insulation layer, a step of forming a second insulation layer to cover the reading head element and the lead conductor layers, a step of forming a second shield layer on the second insulation layer, a step of forming a third insulation layer to make a magnetic gap between magnetic poles of the inductive writing head element, a step of forming a resist pattern with first openings at via holes used for externally connecting the lead conductor layers and a second opening at a back gap hole used for connecting the magnetic poles of the inductive writing head element at their back sides, a step of executing RIE for simultaneously removing the second insulation layer and the third insulation layer located within the first openings of the resist pattern and the third insulation layer located within the second opening of the resist pattern, and a step of removing the resist pattern.

It is preferred that the method further includes a step of forming a fourth insulation layer on the third insulation layer, and a step of forming a coil for driving the inductive writing head element on the fourth insulation material by plating a conductive material, the via holes being simultaneously filled with the plated conductive material.

Preferably, RIE is executed by using a fluorine gas as an etching gas. The fluorine gas is more preferably $CF_4$, $SF_6$ or mixed gas of them.

It is preferred that the lead conductor layers have a multi-layered structure of a Ta layer, a Cu layer and a Ta layer, or that the lead conductor layers have a single layer structure a Cu layer or an Au layer.

Further objects and advantages of the present invention will be apparent from the following description of the preferred embodiments of the invention as illustrated in the accompanying drawings.

BRIEF DESCRIPTION OF THE DRAWINGS

FIGS. 1A to 1C illustrates one manufacturing process in a preferred embodiment according to the present invention, where FIG. 1A shows a plan view, FIG. 1B shows a sectional view seen from a B—B line in FIG. 1A and FIG. 1C shows a sectional view seen from a C—C line in FIG. 1A;

FIG. 2A shows a plan view, FIG. 2B shows a sectional view seen from a B—B line in FIG. 2A and FIG. 2C shows a sectional view seen from a C—C line in FIG. 2A;

FIGS. 3A to 3C illustrates one manufacturing process in the preferred embodiment according to the present invention, where FIG. 3A shows a plan view, FIG. 3B shows a sectional view seen from a B—B line in FIG. 3A and FIG. 3C shows a sectional view seen from a CC line in FIG. 3A;

FIG. 4A shows a plan view, FIG. 4B shows a sectional view seen from a B—B line in FIG. 4A and FIG. 4C shows a sectional view seen from a C—C line in FIG. 4A;

FIGS. 5A to 5C illustrates one manufacturing process in the preferred embodiment according to the present invention, where FIG. 5A shows a plan view, FIG. 5B shows a sectional view seen from a B—B line in FIG. 5A and FIG. 5C shows a sectional view seen from a C—C line in FIG. 5A;

FIG. 6A shows a plan view, FIG. 6B shows a sectional view seen from a B—B line in FIG. 6A and FIG. 6C shows a sectional view seen from a C—C line in FIG. 6A;

FIG. 7A shows a plan view, FIG. 7B shows a sectional view seen from a B—B line in FIG. 7A and FIG. 7C shows a sectional view seen from a C—C line in FIG. 7A;

FIG. 8A shows a plan view, FIG. 8B shows a sectional view seen from a B—B line in FIG. 8A and FIG. 8C shows a sectional view seen from a C—C line in FIG. 8A;

FIGS. 9A to 9C illustrates one manufacturing process in the preferred embodiment according to the present invention, where FIG. 9A shows a plan view, FIG. 9B shows a sectional view seen from a B—B line in FIG. 9A and FIG. 9C shows a sectional view seen from a C—C line in FIG. 9A;

FIG. 10A shows a plan view, FIG. 10B shows a sectional view seen from a B—B line in FIG. 10A and FIG. 10C shows a sectional view seen from a C—C line in FIG. 10A;

FIG. 11A shows a plan view, FIG. 11B shows a sectional view seen from a B—B line in FIG. 11A and FIG. 11C shows a sectional view seen from a C—C line in FIG. 11A;

FIG. 12A shows a plan view, FIG. 12B shows a sectional view seen from a B—B line in FIG. 12A and FIG. 12C shows a sectional view seen from a C—C line in FIG. 12A;

FIG. 13A shows a plan view, FIG. 13B shows a sectional view seen from a B—B line in FIG. 13A and FIG. 13C shows a sectional view seen from a C—C line in FIG. 13A;

FIG. 14A shows a plan view, FIG. 14B shows a sectional view seen from a B—B line in FIG. 14A and FIG. 14C shows a sectional view seen from a C—C line in FIG. 14A;

DESCRIPTION OF THE PREFERRED EMBODIMENTS

Figure 2A:
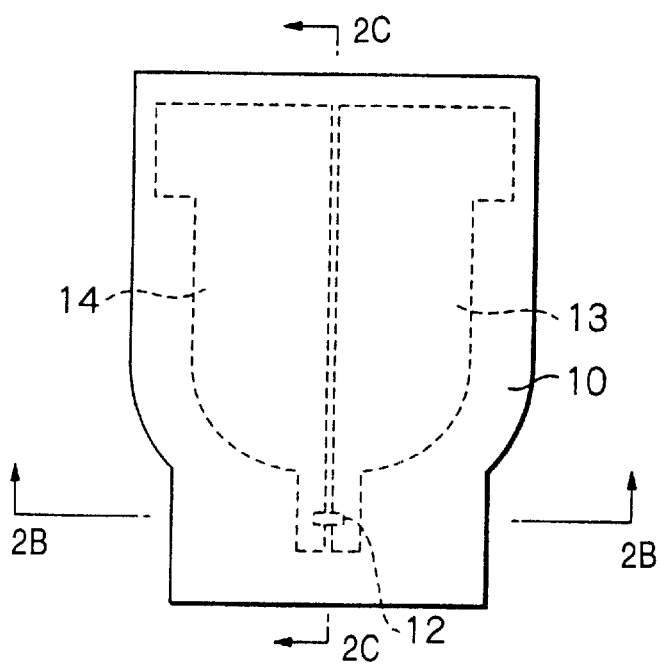
FIGS. 2A to 2C illustrates one manufacturing process in the preferred embodiment according to the present invention, where

FIGS. 1A–1C to 14A–14C illustrate manufacturing processes in a preferred embodiment according to the present invention. In these figures, A shows a plan view, B shows a sectional view seen from a B—B line and C shows a sectional view seen from a C—C line.

As shown in FIGS. 1A to 1C, first, on an under layer 26 (FIG. 15) which has been deposited on a substrate 25 (FIG. 15) of AlTiC for example, a lower shield layer 10 of NiFe for example and a lower insulation or gap layer (G1) 11 of $Al_2O_3$ for example are sequentially deposited and patterned. On the lower gap layer (G1) 11, a MR element 12 which is one example of the reading head element and lead conductor layers 13 and 14 connected to the MR element 12 are then formed. An upper insulation or gap layer (G2) 15 is deposited by sputtering to cover the MR element 12 and the lead conductor layers 13 and 14. In this embodiment, the upper gap layer 15 is made of $Al_2O_3$. The lead conductor layers 13 and 14 in this embodiment are constituted by a triple-layered structure of Ta/Cu/Ta.

Figure 2C:
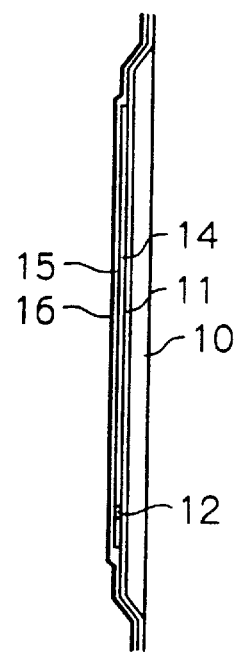
Figure 2B:
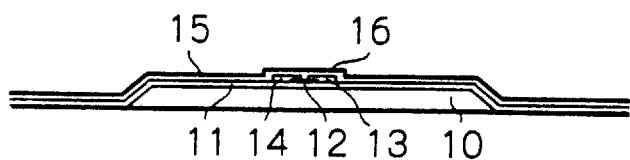

Then, as shown in FIGS. 2A to 2C, a seed layer 16 for plating an upper shield layer is deposited by sputtering. This seed layer 16 may be constituted by a double-layered structure of NiFe/Ti for example.

Figure 4A:
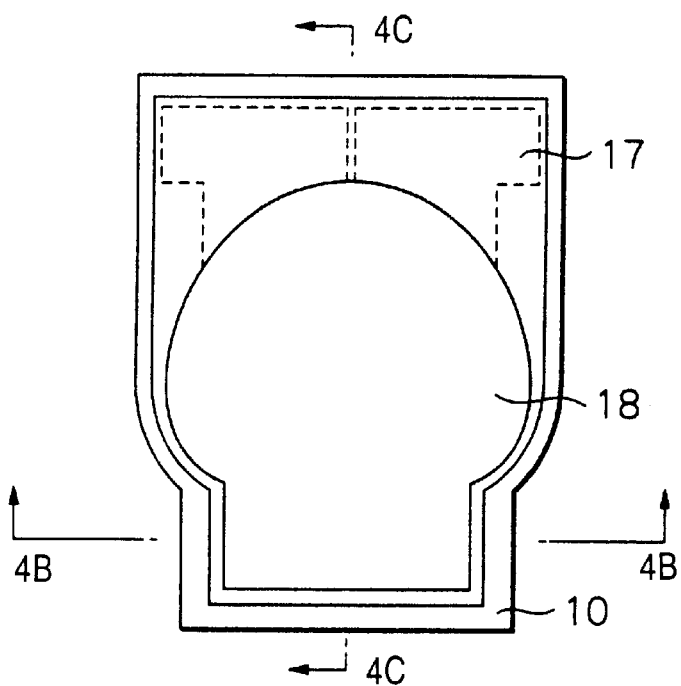
FIGS. 4A to 4C illustrates one manufacturing process in the preferred embodiment according to the present invention, where
Figure 4C:
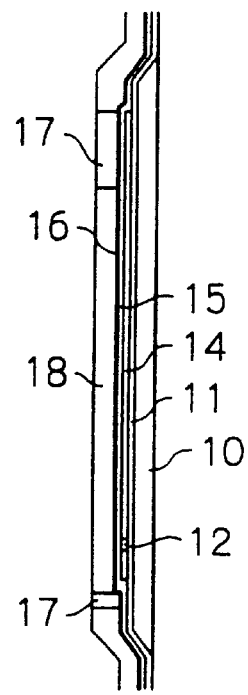
Figure 4B:
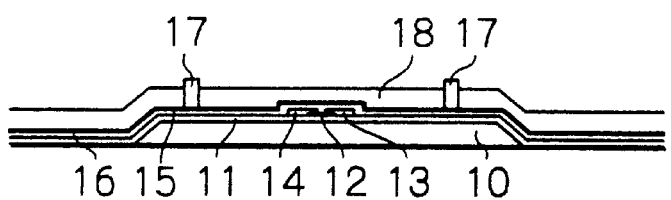

Then, as shown in FIGS. 3A to 3C, a resist pattern 17 for the upper shield layer is formed. Thereafter, as shown in FIGS. 4A to 4C, the upper shield layer 18 which also serves as a lower pole layer of the inductive writing head element is formed by plating. A NiFe layer with a thickness of about 2000 nm for example may be used for the upper shield layer 18.

Figure 6A:
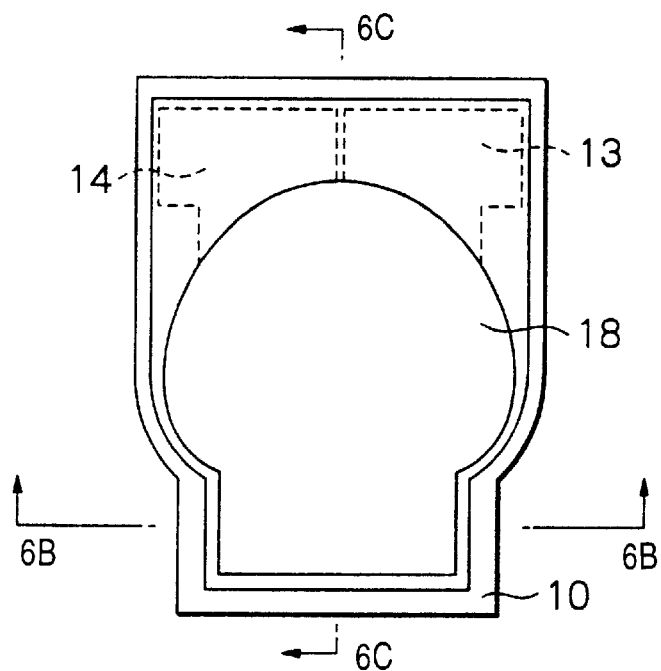
FIGS. 6A to 6C illustrates one manufacturing process in the preferred embodiment according to the present invention, where
Figure 6C:
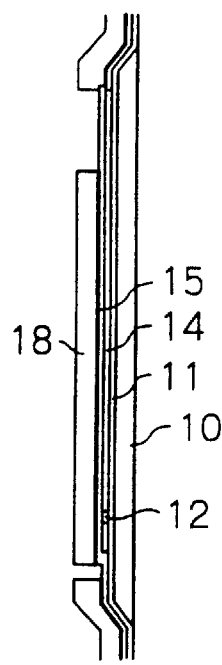
Figure 6B:
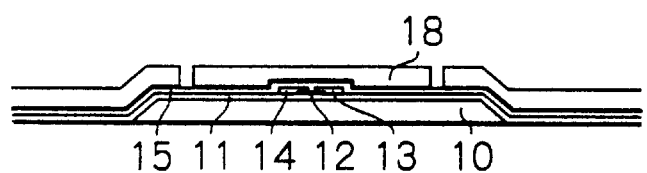

Then, as shown in FIGS. 5A to 5C, the resist pattern 17 is removed, and unnecessary parts of the seed layer 16 which were located under the resist pattern 17 are removed by ion milling as shown in FIGS. 6A to 6C.

Figure 7A:
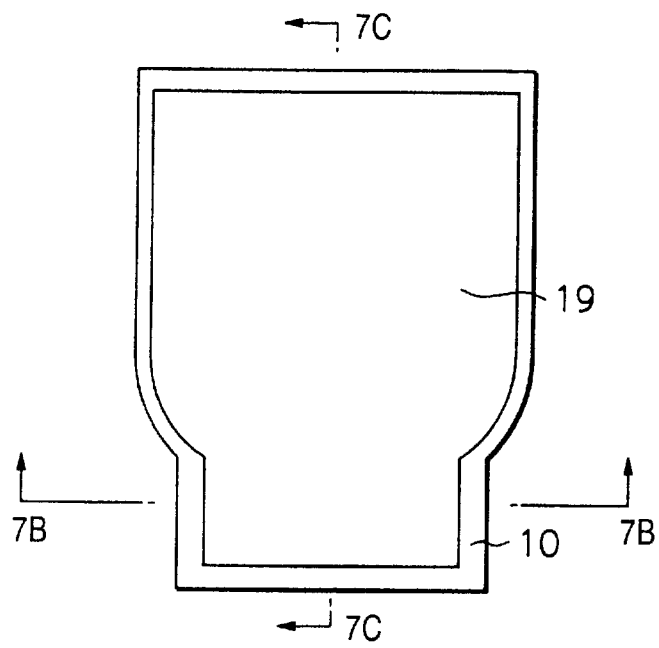
FIGS. 7A to 7C illustrates one manufacturing process in the preferred embodiment according to the present invention, where
Figure 7C:
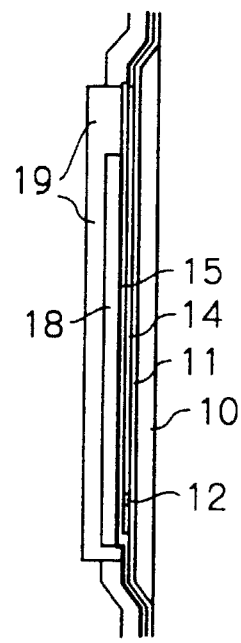
Figure 7B:
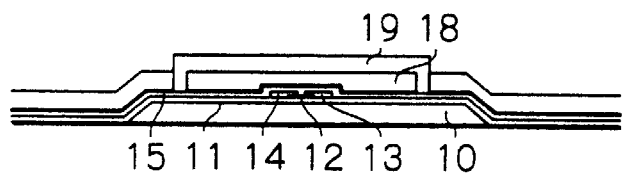
Figure 8A:
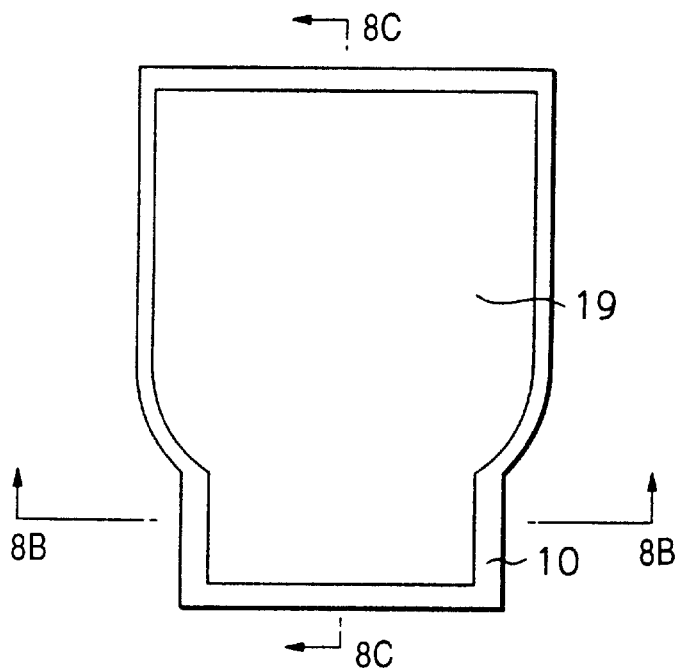
FIGS. 8A to 8C illustrates one manufacturing process in the preferred embodiment according to the present invention, where
Figure 8C:
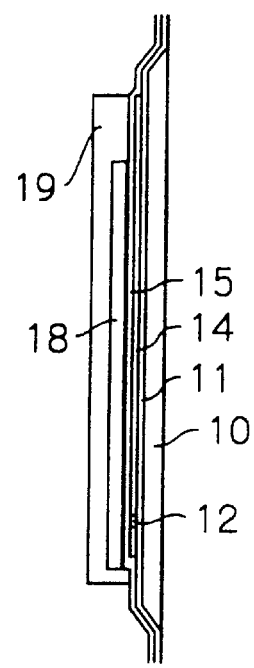
Figure 8B:
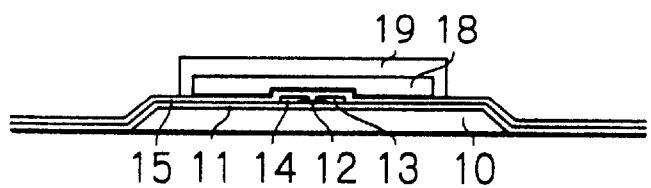

Next, as shown in FIGS. 7A to 7C, a resist layer 19 with a patterned shape is formed. An unnecessary part of the upper shield layer 18 is removed or etched using the resist layer 19 as an etching mask as shown in FIGS. 8A to 8C, and then the resist layer 19 is removed as shown in FIGS. 9A to 9C.

Figure 10A:
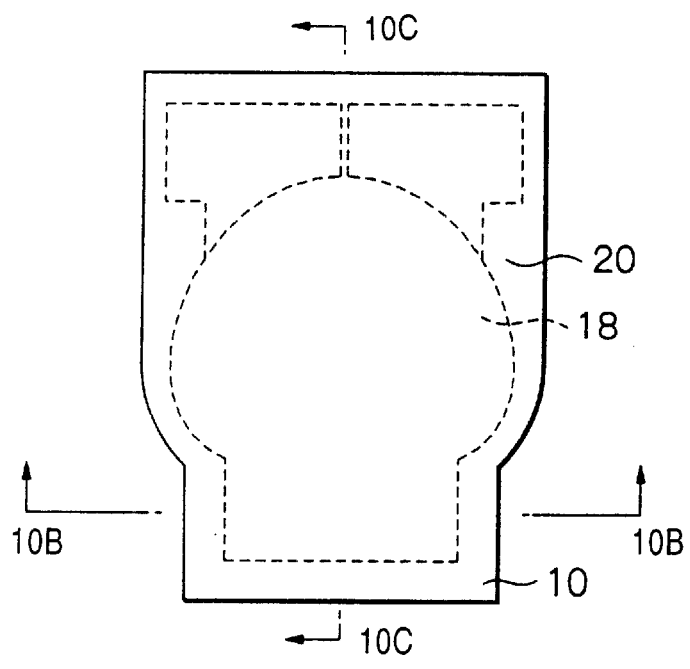
FIGS. 10A to 10C illustrates one manufacturing process in the preferred embodiment according to the present invention, where
Figure 10C:
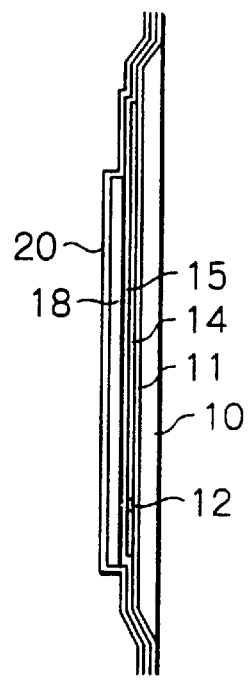
Figure 10B:
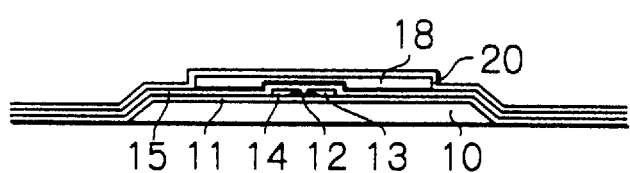

Next, as shown in FIGS. 10A to 10C, a pole gap layer (G3) 20 is deposited on these layers by sputtering. In this embodiment, this pole gap layer 20 is also made of $Al_2O_3$.

Figure 11A:
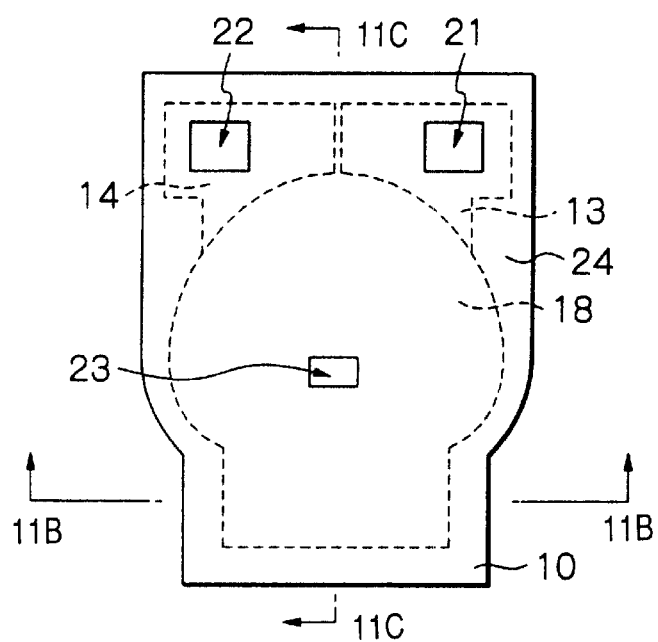
FIGS. 11A to 11C illustrates one manufacturing process in the preferred embodiment according to the present invention, where
Figure 11C:
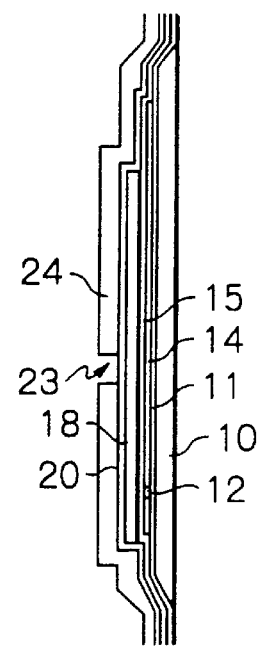
Figure 11B:
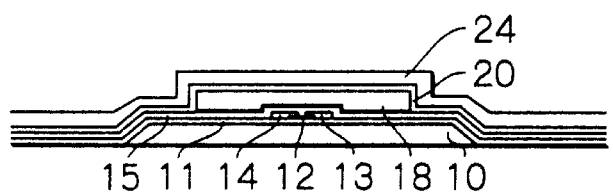

Then, as shown in FIGS. 11A to 11C, a resist pattern 24 with openings for via holes 21 and 22 which are used for electrically connecting the lead conductor layers 13 and 14 of the MR element 12 with external conductors and with an opening for a back gap hole 23 which is used for connecting magnetic poles of the inductive writing head element at their back sides is made. In this embodiment, the resist pattern 24 is made of a novolak positive type photoresist material.

Figure 15:
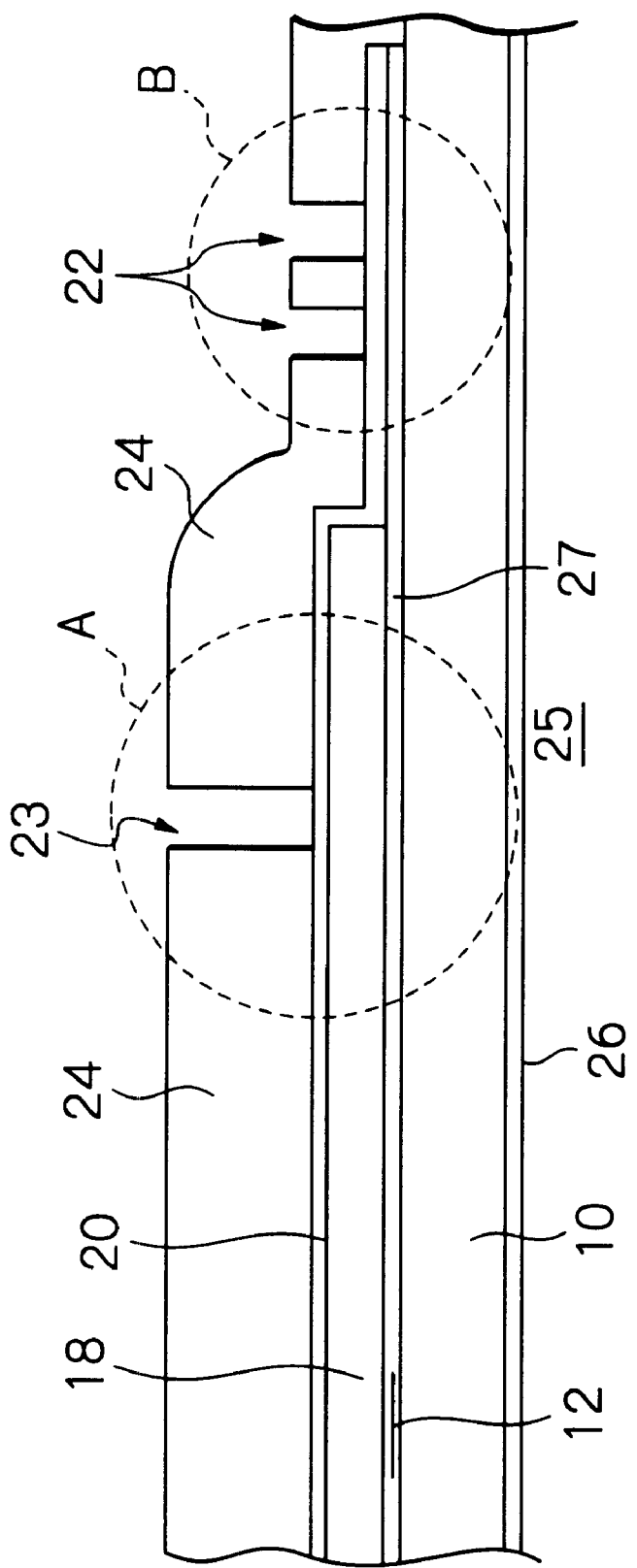
FIG. 15 shows a sectional view around openings for via holes and a back gap hole, cut by different planes, for illustrating a layer structure after a resist pattern for RIE is formed.
Figure 16A:
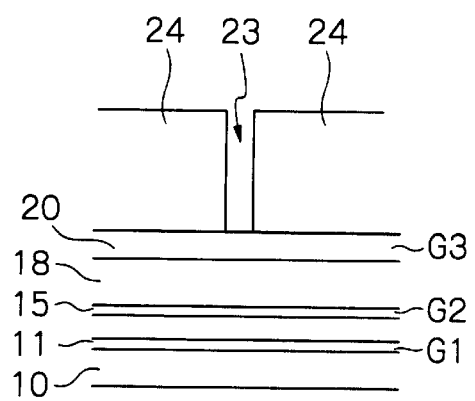
FIGS. 16A and 16B show enlarged views of a back gap hole opening part A and a via hole opening part B shown in FIG. 15, respectively.
Figure 16B:
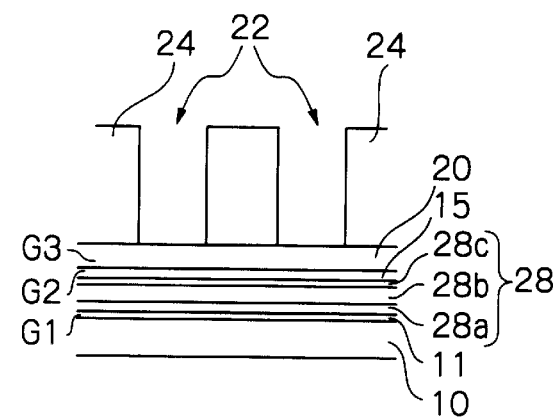

FIG. 15 shows a sectional view around the openings for the via holes 22 and the opening for the back gap hole 23, cut by different planes, for illustrating the layer structure at this stage, and FIGS. 16A and 16B show enlarged views of a part A around the opening for the back gap hole 23 and a part B around the opining for the via holes 22, respectively.

In these figures, reference numeral 25 denotes the aforementioned substrate, 26 the under layer, and 27 a multi-layered structure of the aforementioned lower gap layer (G1) 11, the lead conductor layers 13 and 14 and the upper gap layer (G2) 15, respectively. The lead conductor layers 13 and 14 have a triple-layered structure 28 of a Ta layer 28a with a thickness of about 10 nm, a Cu layer 28b with a thickness of about 100 nm and a Ta layer 28c with a thickness of about 10 nm. The lower shield layer 10, the MR element 12, the upper shield layer 18, the pole gap layer (G3) 20 and the resist pattern 24 are the same configuration as these mentioned before.

As shown in FIG. 16A, at the bottom of the opening for the back gap hole 23 of the resist pattern 24, the pole gap layer (G3) 20 of $Al_2O_3$ is deposited with a thickness of about 370 nm (in general 300–500 nm), and also, at the bottom of the openings for the via holes 22 of the resist pattern 24, the upper gap layer (G2) 15 and the pole gap layer (G3) 20 of $Al_2O_3$ is deposited with a thickness of about 500 nm (in general 450–650 nm).

Under this state, a RIE process is carried out to simultaneously remove $Al_2O_3$ of the pole gap layer (G3) 20 deposited at the bottom of the opening for the back gap hole 23 of the resist pattern 24 and $Al_2O_3$ of the upper gap layer (G2) 15 and the pole gap layer (G3) 20 deposited at the bottom of the openings for the via holes 22 of the resist pattern 24 in the same process. At the opening for the back gap hole 23 of the resist pattern 24, NiFe of the upper shield layer 18 is deposited under the pole gap layer (G3) 20, and at the opening for the back gap hole 23 of the resist pattern 24, the triple-layered structure 28 (Ta layer 28a/Cu layer 28b/Ta layer 28c) of the lead conductor layers 13 and 14 are deposited under the upper gap layer (G2) 15 and the pole gap layer (G3) 20. Thus, in the RIE process, these layers 18 and 28 are utilized as etching stop layers.

Etching gas used in the RIE process may be fluorine gas such as $CF_4$, $SF_6$ or mixed gas of. In this embodiment, $CF_4$ is used. One of preferred RIE conditions is Microwave 1000 W, RF: 40 W, Pressure: 4 mTorr, Flow of $CF_4$: 100 sccm, and Etching Time: 240 seconds.

Figure 18:
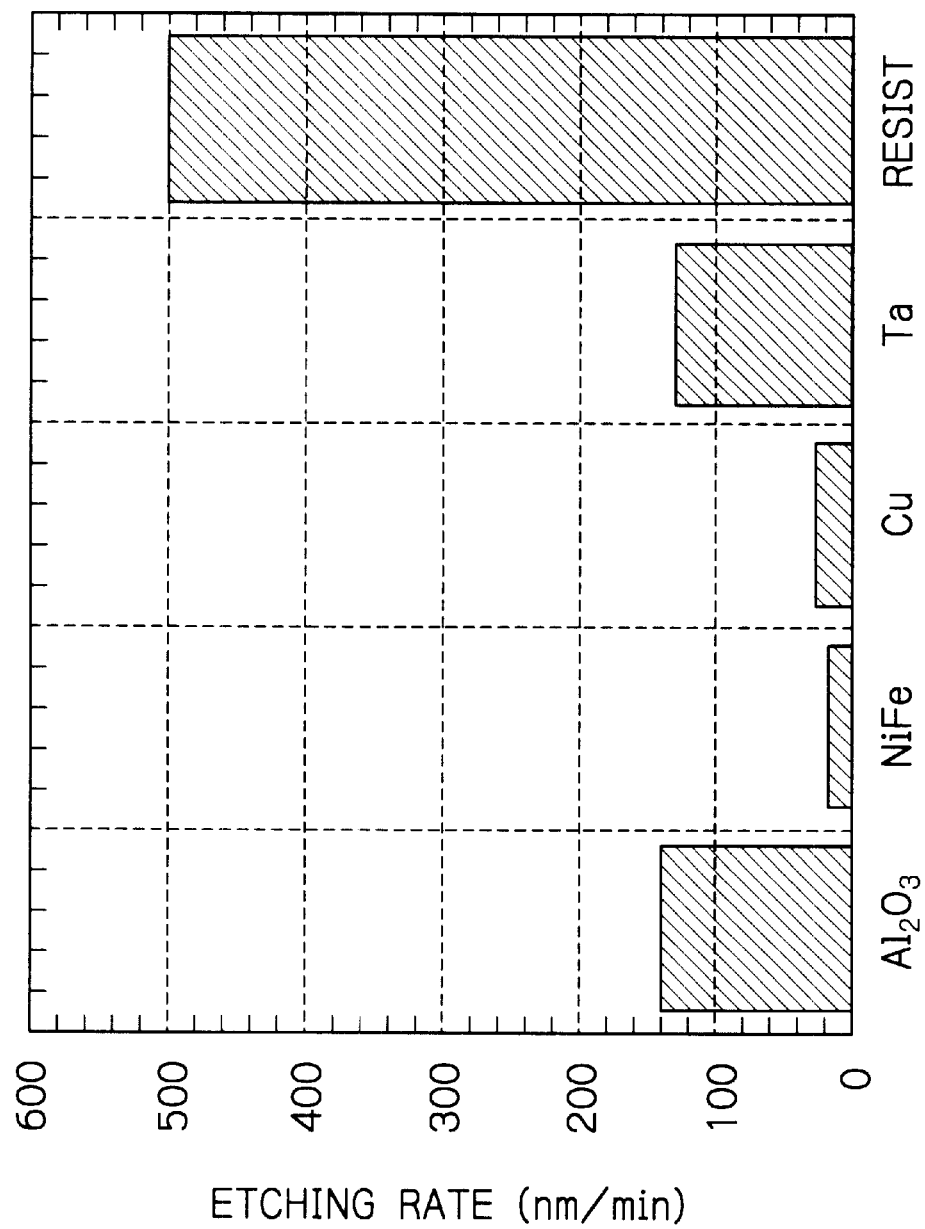
FIG. 18 shows selective etching rates of materials that constitute the respective layers.

FIG. 18 illustrates selective etching rates of materials of the respective layers in RIE. As will be apparent from the figure, the selective etching rates of the layers ($Al_2O_3$): (NiFe): (Cu): (Ta): (Resist) are (7.5) (1.0): (1.5): (6.5) (2.5). Thus, under the above-mentioned RIE conditions, the $Al_2O_3$ layer 20 with 370 nm thickness deposited at the bottom of the opening for the back gap hole 23 of the resist pattern 24 is completely etched and also the NiFe layer 18 under the $Al_2O_3$ layer 20 is over etched by about 30–40 nm depth. Simultaneously, the $Al_2O_3$ layers 20 and 15 with 500 nm and the Ta layer 28c with 10 nm at the bottom of the openings for the via holes 22 of the resist pattern 24 are completely etched and also the Cu layer 28b under the Ta layer 28c is over etched by about 10-42 nm depth.

Figure 12A:
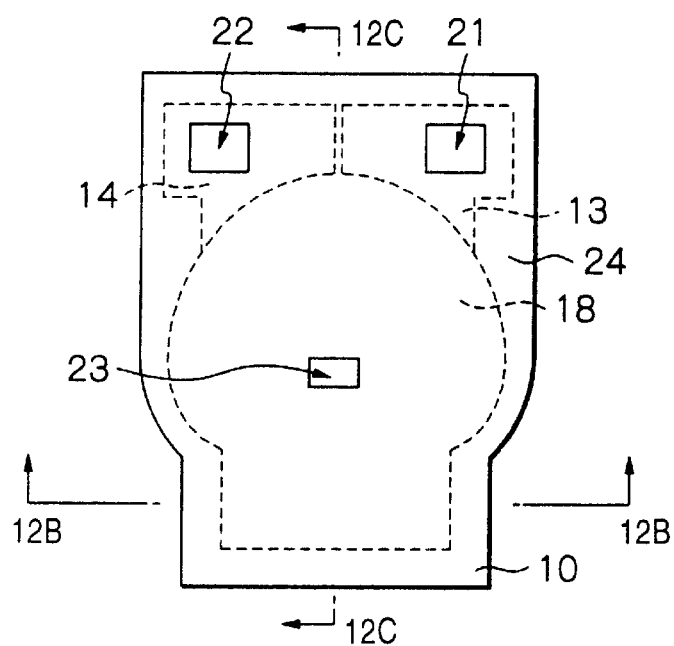
FIGS. 12A to 12C illustrates one manufacturing process in the preferred embodiment according to the present invention, where
Figure 12C:
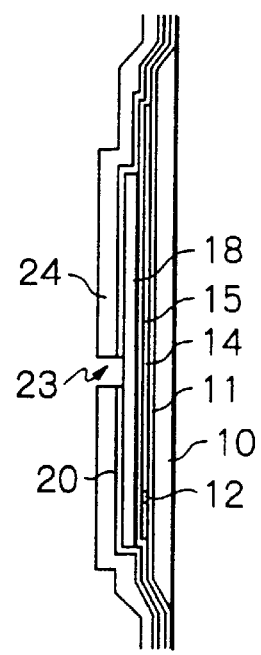
Figure 12B:
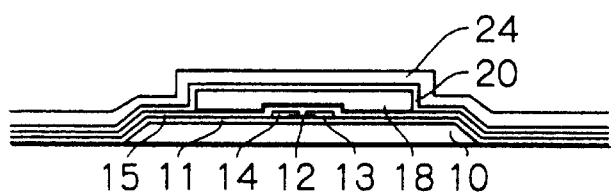
Figure 17A:
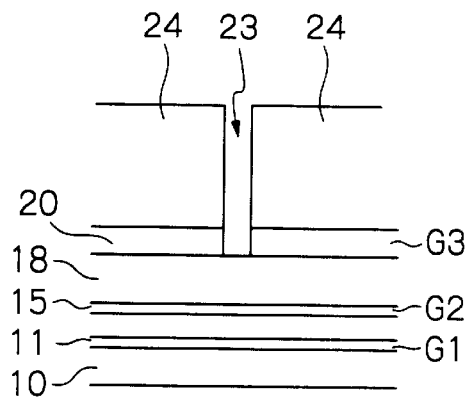
FIGS. 17A and 17B show enlarged views of the back gap hole opening part A and the via hole opening part B after executing RIE, respectively.
Figure 17B:
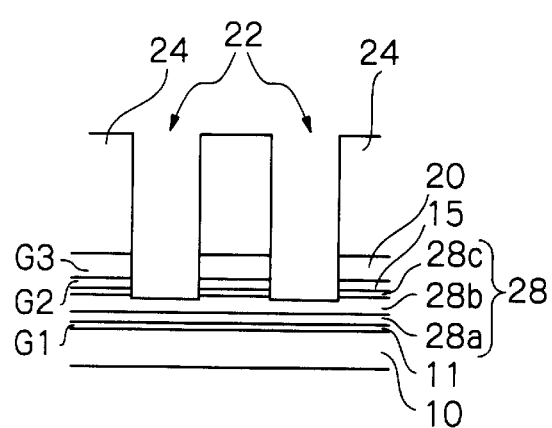

FIGS. 12A to 12B show layer structures after such RIE process is executed, and FIGS. 17A and 17B show enlarged view of the part A around the opening for the back gap hole 23 and the part B around the opinings for the via holes 22 after such RIE process is executed, respectively.

The depth of the etched via holes 22 and the depth of the etched back gap hole 23 were actually measured by a level-difference thickness meter. The measured depth in the via holes 22 was 533.7 nm and that in the back gap layer 23 was 408 nm. Since distribution of RIE etched amount over the wafer is 3.89%, it can be thought that the insulation layers are sufficiently removed by this etching.

Also, electrical conductivity of via hole conductors was actually tested by using a probe after a conductive material was filled in the via holes 21 and 22 at a later manufacturing process by contact plating. According to the actual test, it was confirmed that all of the tested samples have good electrical conductivity through these via hole conductors.

Figure 13A:
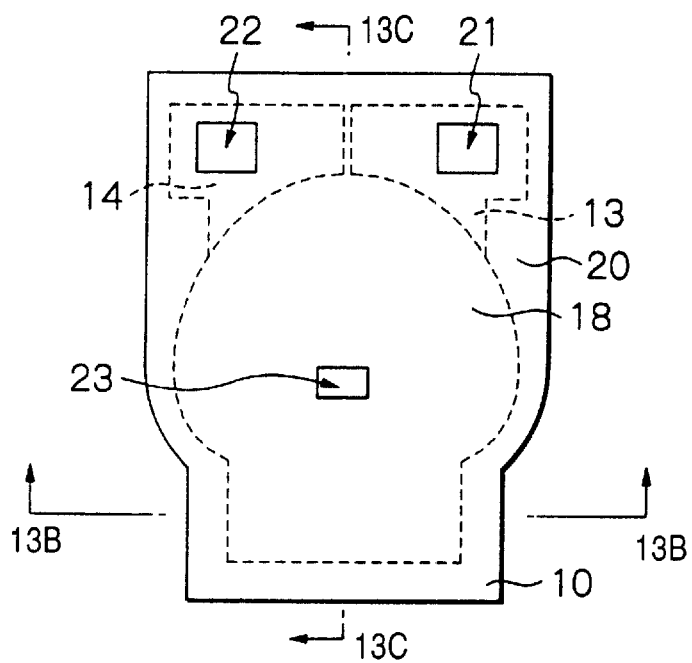
FIGS. 13A to 13C illustrates one manufacturing process in the preferred embodiment according to the present invention, where
Figure 13C:
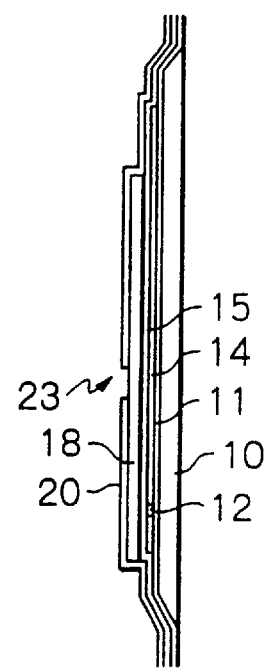
Figure 13B:
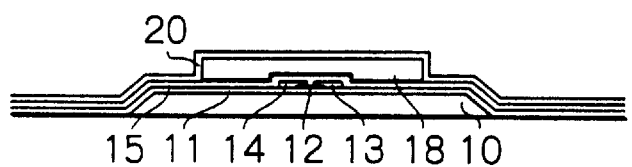

After finishing the RIE process, the resist pattern 24 is removed as shown in FIGS. 13A to 13C. The removing of the mask resist can be done by ashing method or a resist flaking method using organic resist flaking liquid. One of preferred ashing conditions is Microwave : 1200 W, Flow of $CF_4$ : 24 sccm, Flow of $O_2$: 776 sccm, Pressure : 0.9 Torr and Ashing Time 200 sec. In the resist flaking, a preferred resist flaking time is 90 seconds. Using the ashing method and the resist flaking method together is also possible.

Figure 14A:
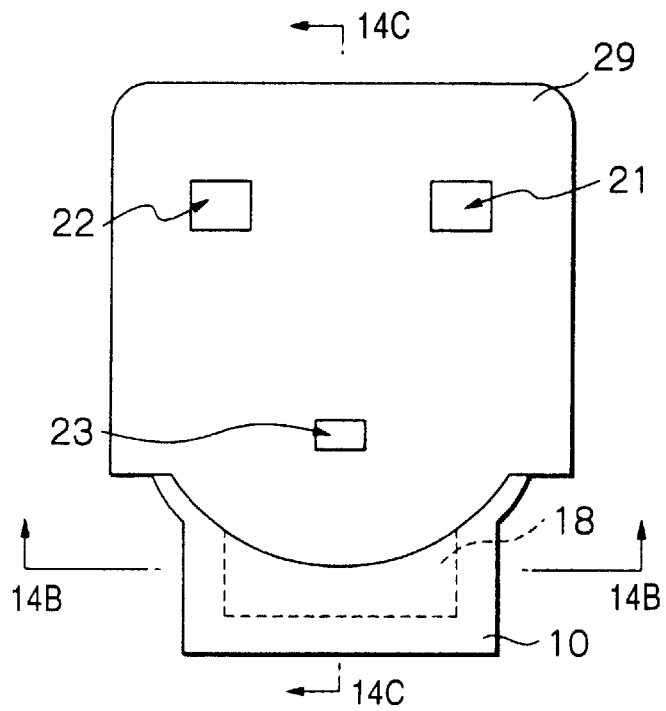
FIGS. 14A to 14C illustrates one manufacturing process in the preferred embodiment according to the present invention, where
Figure 14C:
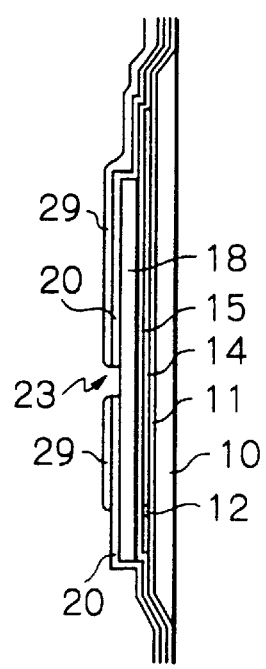
Figure 14B:
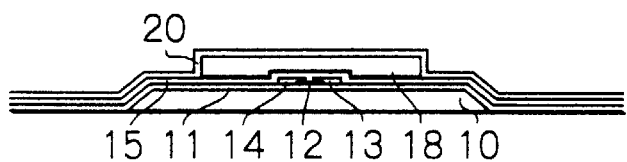

Then, as shown in FIGS. 14A to 14C, a lower coil insulation layer 29 of the inductive element is deposited and patterned. This coil insulation layer 29 will be made of a resist material. On the coil insulation layer 29, a coil for driving the inductive element is formed by plating Cu. In this plating process, the via holes 21 and 22 are simultaneously plated and filled with Cu so as to form via hole conductors constituted by only Cu.

Following manufacturing processes in this embodiment are the same as these in the conventional art.

According to the embodiment, as aforementioned, the pole gap layer (G3) 20 deposited at the bottom of the opening for the back gap hole 23 of the resist pattern 24 and the upper gap layer (G2) 15 and the pole gap layer (G3) 20 deposited at the bottom of the openings for the via holes 21 and 22 of the resist pattern 24 are removed by RIE, in the same process. Since RIE etching rate of the insulation layer or layers to be etched greatly differs from that of the stop layer which is located under the insulation layer or layers and exposed during etching, the insulation layer or layers with different thickness can be simultaneously and extremely easily etched by RIE.

Furthermore, since the back gap hole and the via holes are formed in the same manufacturing process, it is not necessary to fill the via holes to a partial depth with material used for forming the upper shield layer in order to protect their bottom surfaces from etching. Thus, the via hole conductors can be made of Cu only, resulting the electrical resistance of the whole lead conductors connected to the MR element to keep quite low.

Although the triple-layered structure of Ta/Cu/Ta is used as for the lead conductor layers 13 and 14 in the embodiment mentioned above, a single layer structure of Cu or Au may be used as for the lead conductor layers 13 and 14 in modification.

Many widely different embodiments of the present invention may be constructed without departing from the spirit and scope of the present invention. It should be understood that the present invention is not limited to the specific embodiments described in the specification, except as defined in the appended claims.

What is claimed is:

1. A manufacturing method of a composite type thin-film magnetic head with a reading head element and an inductive writing head element, said method comprising the steps of:

forming said reading head element and lead conductor layers on a first insulation layer which is formed on a first shield layer, said lead conductor layers being connected to said reading head element and wherein each of said lead conductor layers is formed from a group consisting of a multi-layered structure of a tantalum layer, a copper layer and a tantalum layer or a single layer structure of a copper layer or a single layer structure of a gold layer;

forming a second insulation layer to cover said reading head element and said lead conductor layers;

forming a second shield layer on said second insulation layer;

forming a third insulation layer over said second shield layer and exposed second insulation layer to make magnetic gap between magnetic poles of said inductive writing head element; and forming via holes used for externally connecting said lead conductor layers and a back gap hole used for connecting the magnetic poles of said inductive writing head element at their back sides, said via holes and back gap hole forming being executed by simultaneous reactive ion etching using a fluorine gas as an etching gas for completely removing said second insulation layer and said third insulation layer located at said via holes and said third insulation layer located at said back gap hole, wherein said back gap hole is formed in a region over said second shield layer, and wherein said via holes are formed in a region over said lead conductor layers so as to use lead conductor layers as etching stop layers of the reactive ion etching.

2. The method as claimed in claim 1, wherein said via holes and back gap hole forming step includes forming a resist pattern with first openings at said via holes and a second opening at said back gap hole; executing reactive ion etching for simultaneously removing said second insulation layer and said third insulation layer located within said first openings of said resist pattern and said third insulation layer located within said second opening of said resist pattern; and removing said resist pattern.

3. The method as claimed in claim 1, wherein said method further comprises the steps of forming a fourth insulation layer on said third insulation layer, and forming a coil for driving said inductive writing head element on said fourth insulation material by plating a conductive material, said via holes being simultaneously filled with the plated conductive material.

4. The method as claimed in claim 1, wherein said fluorine gas is selected from a group of consisting of $CF_4$, $SF_6$ or mixed gas of $CF_4$ and $SF_6$.

5. The method as claimed in claim 1, wherein said lead conductor layers have a multi-layered structure of a top tantalum layer, a middle copper layer and a bottom tantalum layer, and wherein all of the top tantalum layer and part of the middle copper layer is etched in said via holes by said reactive ion etching.

6. A manufacturing method of a composite type thin-film magnetic head with a reading head element and an inductive writing head element, said method comprising the steps of:

preparing a substrate;

depositing an under layer on said substrate;

forming a first shield layer on said under layer;

forming a first insulation layer to cover said first shield layer; forming said reading head element and lead conductor layers on said first insulation layer, said lead conductor layers being connected to said reading head element and wherein each of said lead conductor layers is formed from a group consisting of a multi-layered structure of a tantalum layer, a copper layer and a tantalum layer or a single layer structure of a copper layer or a single layer structure of a gold layer;

forming a second insulation layer to cover said reading head element and said lead conductor layers;

forming a second shield layer on a portion of said second insulation layer;

forming a third insulation layer over said second shield layer and exposed second insulation layer to make a magnetic gap between magnetic poles of said inductive writing head element;

forming a resist pattern with first openings at via holes used for externally connecting said lead conductor layers and a second opening at a back gap hole used for connecting the magnetic poles of said inductive writing head element at their back sides;

executing simultaneous reactive ion etching using a fluorine gas as an etching gas for completely removing said second insulation layer and said third insulation layer located within said first openings of said resist pattern and said third insulation layer located within said second opening of said resist pattern, wherein said back gap hole is formed in a region over said second shield layer, and wherein said via holes are formed in a region over said lead conductor layers so as to use said lead conductor layers as etching stop layers of the reactive ion etching; and removing said resist pattern.

7. The method as claimed in claim 6, wherein said method further comprises the steps of forming a fourth insulation layer on said third insulation layer, and forming a coil for driving said inductive writing head element on said fourth insulation material by plating a conductive material, said via holes being simultaneously filled with the plated conductive material.

8. The method as claimed in claim 6, wherein said fluorine gas is selected a group of consisting of $CF_4$, $SF_6$ or mixed gas of $CF_4$ and $SF_6$.

9. The method as claimed in claim 6, wherein said lead conductor layers have a multi-layered structure of a top tantalum layer, a middle copper layer and a bottom tantalum layer, and wherein all of the top tantalum layer and part of the middle copper layer is etched in said first openings by said reactive ion etching.

* * * * *